United States Patent [19]

Deeb et al.

[11] Patent Number: 4,944,890
[45] Date of Patent: Jul. 31, 1990

[54] COMPOSITIONS AND PROCESS OF USING IN REFRIGERATION

[75] Inventors: Thomas M. Deeb; George K. Henry, both of Newark, Del.; Heather L. Bergmann, Fairfax, Va.

[73] Assignee: E. I. Du Pont de Nemours and Company, Wilmington, Del.

[21] Appl. No.: 356,330

[22] Filed: May 23, 1989

[51] Int. Cl.$^5$ .......................................... C10M 107/38
[52] U.S. Cl. ......................................... 252/54; 252/58; 252/68
[58] Field of Search ..................... 252/52, 58, 67, 68, 252/54

[56] References Cited

U.S. PATENT DOCUMENTS 4,359,394 11/1982 Gainer et al. .......................... 252/58
4,758,366 7/1988 Parekh .................................... 252/68

FOREIGN PATENT DOCUMENTS 0080373 5/1983 Japan ..................................... 252/68

Primary Examiner—Jacqueline V. Howard

[57] ABSTRACT

A blend of refrigerant with at least one fluorinated hydrocarbon, in which the weight ratio of fluorine-to-carbon is from about 0.5 to 5, and which has an SUS viscosity at 100° F. of at least 50 and a pour point of less than about −20° C. is disclosed for use in compression refrigeration.

13 Claims, No Drawings

COMPOSITIONS AND PROCESS OF USING IN REFRIGERATION

FIELD OF THE INVENTION

This invention relates to lubricants used with refrigerants in compression refrigeration and air-conditioning systems. More particularly, it relates to lubricants for use with saturated hydrocarbons having 1–4 carbon atoms that are partially or fully substituted with at least one atom of chlorine or fluorine, and have a normal boiling point of −80° C. to +50° C. Specifically, this invention relates to lubricants for use with tetrafluoroethanes, e.g. 1,1,1,2-Tetrafluoroethane (HFC-134a), and 1,1,2,2-Tetrafluoroethane (HFC-134), etc. and of lesser importance, pentafluoroethane (HFC-125). These compounds are being considered as replacements for dichlorodifluoromethane (CFC-12), particularly in automotive air conditioning systems. The lubricants of this invention are not only completely miscible over the full operating temperature range for automotive air-conditioning with HFC-134a and the like, but are also completely miscible with CFC-12 over this range. Hence, they may be used with CFC-12 in the same systems during the transition from CFC-12 to HFC-134a.

BACKGROUND OF THE INVENTION

Refrigeration systems that use CFC-12 as the refrigerant generally use mineral oils to lubricate the compressor. (See for example the discussion in Chapter 32 of the 1980 ASHRAE Systems Handbook.) CFC-12 is completely miscible with such oils throughout the entire range of refrigeration system temperatures, i.e. −45° C. to 65° C. In automotive air-conditioning, paraffinic and naphthenic oils of about 500 SUS viscosity at 100° F. are usually used with CFC-12. These oils have "pour points" below −20° C. and viscosities of about 55 SUS at 210° F. and are completely miscible with the CFC-12 refrigerant over the range of temperatures from −10° C. to 100° C. Consequently, oil which dissolves in the refrigerant travels through the refrigeration loop in the air conditioning system and returns with the refrigerant to the compressor. It does not separate during condensation, although it may accumulate because of the low temperature when the refrigerant is evaporated. At the same time, this oil which lubricates the compressor will contain some refrigerant which, in turn, may affect its lubricating properties.

When substituting HFC-134a or HFC-134 for CFC-12 in these refrigeration systems, it would be desirable to be able to use the same oils as used with CFC-12. It would not require any substantial change in equipment nor any significant changes in conditions used for the system. If lubricant separates from refrigerant during operation of the system, serious problems may result, i.e. the compressor could be inadequately lubricated. This would be most serious in automotive air-conditioning systems because the compressors are not separately lubricated and a mixture of refrigerant and lubricant circulate throughout the entire system. Unfortunately, however, the mineral oils are substantially immiscible with the tetrafluoroethanes.

Two recent publications of ASHRAE discuss the problems associated with separation of lubricants and refrigerants. These are "Fundamentals of Lubrication in Refrigerating Systems and Heat Pumps" Kruse and Schroeder ASHRAE Transactions Vol. 90 Part 2B, pps. 763–782, 1984 and "Evaluation of Lubricants for Refrigeration and Air-Conditioning Compressors", Spauschus, ibid pps. 784–798.

In summary, refrigerants which are not completely miscible with an oil in the full range of mixture compositions and operating temperatures may become miscible or immiscible as the temperature is raised or lowered from room temperature. The areas of immiscibility may assume a variety of shapes, i.e. parabolic or non-parabolic. As a parabola, the curve of miscibility temperature vs. percent oil in the mixture, may have its open or concave portion facing the low or high temperatures. The closed or convex-portion of the parabolic curve identifies, respectively, the maximum or minimum temperature above or below which the refrigerant and the lubricating oil are completely miscible. These temperatures are referred to as the maximum or minimum "consolute temperatures." Beside parabolas, these curves can assume skewed parabolic shapes or curves of varying slope wherein immiscibility occurs above or below the curve.

One of the objects of this invention is to provide a combination of lubricating oil and refrigerants such as tetrafluoroethane, e.g. HFC-134a, where the area of miscibility encompasses the full range of temperature and composition encountered in compression refrigeration, i.e. complete miscibility occurs for all compositions in the range of −45° C. to at least 20° C., preferably to 100° C., the critical temperature of HFC-134a. Another object is to provide a process for using such compositions in compression refrigeration.

PRIOR ART

U.S. Pat. No. 4,248,726, issued Feb. 5, 1981, and U.S. Pat. No. 4,267,064, issued May 12, 1981, both to Nippon Oil Company et al, relate to the use of a polyglycol oil such as polyoxypropylene glycol (or an alkyl ether thereof) having a viscosity index of at least 150 and a glycidyl ether type epoxy compound as a high viscosity refrigeration oil composition for halogen-containing refrigerants. These polyglycol/glycidyl ether compositions are disclosed for use with Freon®11, 12, 13, 22, 113, 114, 500 and 502; and as being "particularly effective" with Freon®12 or 22.

Research Disclosure 17486 entitled "Refrigeration Oil by E. I. du Pont de Nemours and Company discloses polyalkylene glycols such as Ucon® LB-165 and Ucon® LB-525 sold by Union Carbide Corporation, for use with HFC-134a. These glycols are polyoxypropylene glycols that are mono-functional and are prepared from propylene oxide initiated with n-butanol. The publication states that these combinations of oil and refrigerant are miscible in all proportions at temperatures at least as low as −50° C. and are thermally stable in the presence of steel, copper and aluminum at 175° C. for about six days.

U.S. Pat. No. 4,755,316, issued July 5, 1988, to Allied-Signal Inc. also relates to the use of polyalkylene glycols. However, these glycols are at least difunctional with respect to hydroxyl groups and contain at least 80% propylene oxide units relative to the total, the remaining 20% may derive from ethylene or butylene oxide or esters, olefins and the like which are polymerizable with propylene oxide. It should be noted that only 100% oxypropylene units in the difunctional PAGs are exemplified in this patent.

SUMMARY OF THE INVENTION

The present invention is based on the discovery that the use of a sufficient amount to lubricate, usually 10–20% by volume for automotive use, and in some situations as high as 50% by volume, of at least one fluorinated hydrocarbon, saturated or unsaturated, in which the weight ratio of fluorine-to-carbon is from about 0.5 to 5, having an SUS viscosity at 100° F. of at least 50 and a pour point of less than about −20° C., hereafter referred to as an "HFC oil," will be completely miscible with tetrafluoroethanes and pentafluoroethane, usually 80–90% by volume of the tetrafluoroethanes, HFC-134 and HFC-134a, the pentafluoroethane, HFC-125, and other saturated hydrocarbons having 1–4 carbon atoms that are partially or fully substituted with at least one atom of chlorine or fluorine and a normal boiling point of −80° C. to +50° C., or blends thereof, in the range of temperatures from −40° C. to at least 20° C., preferably to 100° C., the critical temperature of HFC-134a.

The preferred HFC oils include polymers of $R_f$ $(CH_2)_n$ $CH=CH_2$ where "$R_f$" may be anywhere from $CF_3$- to $C_{10}F_{21}$- or higher, preferably $C_6F_{13}$-, $C_8F_{17}$-, $C_{10}F_{21}$- and higher, and n=0–2, but preferably n=1; and copolymers of $R_f(CH_2)_n$ $CH=CH_2$ with a variety of vinyl compounds, e.g. butyl vinyl ether, acrylonitrile and the like. A particularly useful HFC oil in this category is where $C_6F_{13}$- represents 60%, $C_8F_{17}$- represents 30% and $C_{10}F_{21}$- and higher represents the remainder of "$R_f$" and n=1. It has also been found that these preferred HFC oils are completely miscible in the CFC's particularly in CFC-12.

Another category of HFC oil for use with the tetrafluoroethanes in the present invention involves the products resulting from grafting hexafluoropropylene or a similar perfluorocarbon onto long chain aliphatic hydrocarbons, $C_8$ or greater. These are described in U.S. patent application Ser. No. CH-1686 filed in the name of H. Cripps.

The weight ratio of refrigerant to the lubricant, the "HFC oil", may be anywhere from 99/1 to 1/99, preferably 99/1 to 70/30. The viscosity of these oils may range from 50 to 3000 SUS at 100° F., but for most commercial uses, from 100 to 1200 SUS at 100° F.

It is known that the use of an appropriate amount of an "extreme pressure (EP) additive" improves the lubricity and load-bearing characteristics of oils and, thus, would improve the quality of the refrigerant-lubricant compositions. EP additives for use in the invention are included among those disclosed in Table D of U.S. Pat. No. 4,755,316. A preferred one is an organic phosphate; SYN-O-AD ® 8478, a 70%/30% blend of tri (2,4,6-tri-t-butyl phenyl) phosphate/triphenyl phosphate, manufactured by the Stauffer Chemical Company.

EP additives may also be used in conjunction with some of the antiwear additives, oxidation and thermal stability improvers, corrosion inhibitors, viscosity index improvers, detergents and anti-foaming agents disclosed in Table D of U.S. Pat. No. 4,755,316. These additives may also be partially or fully fluorinated.

DESCRIPTION OF THE PREFERRED EMBODIMENTS

As stated previously, the tetrafluoroethanes, e.g. HFC-134a, HFC-134 and the pentafluoroethane, HFC-125, particularly HFC-134a have physical characteristics which allow substitution for CFC-12 with only a minimum of equipment changes in compression refrigeration. They could be blended with each other, as well as with other refrigerants, including CFC-12($CCl_2F_2$), HCFC-22($CHClF_2$), HFC-152a($CH_3CHF_2$), HCFC-124($CHClCF_3$), HCFC-124a($CHF_2CClF_2$), HCFC-142b($CH_3CClF_2$), HFC-32($CH_2F_2$), HFC-143a($CH_3CF_3$), HFC-143($CHF_2CH_2F$), and FC-218 ($CF_3CF_2CF_3$); and for purposes of the present invention such blends are not excluded. However, only those blends of tetrafluoroethane or pentafluoroethane with other refrigerants which are miscible with the lubricants of this invention in the range of −40° C. to about +20° C. are included.

HFC-134a, the preferred tetrafluoroethane refrigerant, may be prepared by any of the methods disclosed in the prior art; e.g., U.S. Pat. Nos. 2,745,886; 2,887,427; 4,129,603; 4,158,675; 4,311,863; 4,792,643 and British Nos. 1,578,933 and 2,030,981.

The preferred HFC oil is the polymerization product of $R_f$ $(CH_2)_n CH=CH_2$ where the number of carbon atoms in the $R_f$ group is 2 to 20, preferably 6–10, and n=0 or 1. The most preferred is a member of this group wherein $R_f=C_6F_{13}$ (60%), $C_8F_{17}$ (30%), and $C_{10}F_{21}$ and higher (the remainder) and n=0 or 1.

These may be prepared by any of the processes disclosed in U.S. Pat. Nos. 4,606,832; 4,668,749; and 4,673,712. A polymerization process employing a peroxide initiator is preferred with a reaction temperature between 50° C. and 200° C.

These HFC oils may be varied to yield viscosities ranging from 50 to 3000 SUS at 100° F. Furthermore, the monomer(s) may be copolymerized with any of a variety of vinyl compounds including but not limited to vinyl ethers, acrylates, methacrylates, acrylonitrile, vinyl ethoxylates or a halogenated monomer to modify the lubricating properties. The HFC oils may be blended with other lubricants, e.g. perfluorocarbons, to modify viscosity and/or lubrication properties.

Specifically, the lubricants used in the compositions of this invention, and in the invented method for providing lubrication in compression refrigeration and air-conditioning equipment have the the following characteristics:

Viscosity at 100° F.

50 to 3000 SUS, preferably 100 to 1200 SUS, particularly about 500 SUS for automotive air-conditioning Pour Point < −20° C., preferably −20° C. to about −50° C. and −30° C. for the 100 SUS and 500 SUS oils, respectively Solubility or miscibility range 100% from 100° C. to (a) less than −40° C. for 1–99 weight percent of HFC-134a in mixture with the HFC lubricant of 100° F. viscosities of 50 SUS to 2500 SUS (b) less than −30° C. for the preferred divinyl ether copolymer, and (c) less than −35° C. for the preferred 520 SUS blend.

Four-ball wear test with a specific set of steel balls. Scar wear and coefficient of friction equal to or slightly higher than that for the oils currently used with CFC-12 in automotive air-conditioning, i.e., 0.37 mm scar wear and 0.07 friction coefficient when saturated with CFC-12 at atmospheric pressure.

"Falex" (load failure test) with a specific type of steel for the V-block and pin. The fail load equal to or greater than that for the CFC/refrigerant oil combinations, i.e., 1300 lbs. when saturated with CFC-12 at atmospheric pressure.

1. Solubility of Refrigerant in Lubricants

Six ml. blends of refrigerant and lubricant were used for the solubility studies. Generally, the mixtures contained 30, 60, and 90 wt. % refrigerant. These air-free mixtures were contained in sealed Pyrex ® tubes (7/16" I.D.×5.5", ca. 12.5 cc capacity). The refrigerant/lubricant solubilities were determined by completely immersing the tube in a bath at each test temperature for a minimum of 15 minutes and providing agitation to facilitate mixing and equilibration. The accuracy of determining the temperatures when the refrigerant/lubricant blend became either miscible or immiscible was about ±2° C. The refrigerant/lubricant blends were called immiscible when the blend acquired and retained "schlieren" lines; formed floc; or formed two liquid layers. These solubility tests were run from 93° to −50° C. Tests were not run above 93° C. for safety reasons. It is assumed that if the blend of HFC-134a/oil is soluble to 93° C., it will still be soluble at 100.5° C., the critical temperature of HFC-134a.

2. Stability of Refrigerant and Lubricant

Three ml. of refrigerant and 0.3 ml. of lubricant plus coupons (steel 1010/copper/aluminum 1100-2⅜"×¼"×1/16", 120-grit surface finish) were charged and sealed in a Pyrex ® tube (7/16" I.D.×5.5", ca. 12.5 cc volume) under anaerobic conditions. The specimens were tied together at the top end with copper wire with copper-wire rings between the metals to separate the metals at the top end. The tubes were stored vertically at 268° C. for 11.8 days. Afterwards, the tube contents were examined for appearance changes. The refrigerants were then transferred to gas-sampling bulbs for analysis by gas chromatography for the decomposition products of the refrigerant i.e., HFC-143 (the decomposition product of HFC-134a) or HCFC-22 (CFC-12 decomposition product). These results were then converted to their equivalents in terms of HF and HCl generated.

3. Lubricity a. Four-ball Wear Test

The procedure is described fully in ASTM D4172. The method was modified as follows: A load of 20 Kg at 1200 RPM was put on the steel 52100 balls immersed in 10 ml. of lubricant. The refrigerant, HFC-134a or CFC-12, was bubbled through a Teflon ® capillary tube into the lubricant at the rate of 0.75 standard cu. ft./hr. to provide one atmosphere of pressure of refrigerant gas over the lubricant and a gas-saturated lubricant.

b. Falex Pin/V-Block Load-to-Failure Test D3233. The V-Block was made of AISI C-1137 steel (HRC-20 to 24 hardness, 5 to 10 microinches surface finish). The test pin was made of AISI 3135 steel (HRB-87 to 91 hardness, 5 to 10 microinches surface finish). These tests were run with refrigerant gas bubbling through the oil as in the "Four-ball Wear Test".

4. Viscosity and Viscosity Slope a. Viscosity is a property that defines a fluid's resistance to shearing force. It is expressed in terms of absolute viscosity, kinematic viscosity or Saybolt Seconds Universal viscosity (SSU), depending on the method by which it is determined. Conversion from SSU to mm²/s (centistokes) can be readily made from tables contained in ASTM D-445, but it is necessary to know the density to convert kinematic viscosity to absolute viscosity. Refrigeration oils are sold in viscosity grades, and ASTM has proposed a system of standardized viscosity grades for industry-wide usage (D-2422).

Viscosity decreases as the temperature increases; and increases as the temperature decreases. The relationship between temperature and kinematic viscosity is represented by:

$$\log \log (v+0.7) = A + B \log T \qquad \text{(Equation 1)}$$

where
  v = kinematic viscosity, mm²/s (CST)
  T = thermodynamic temperature (kelvin)
  A,B = constants for each oil This relationship is the basis for the viscosity temperature charts published by ASTM and permits a straight line plot of viscosity over a wide temperature range. This plot is applicable over the temperature range in which the oils are homogeneous liquids.

b. Viscosity Slope is a measure of the amount of change in viscosity experienced by an oil with change in temperature. This ratio is "B" in Equation 1 above; and is usually different for different oils.

5 Pour Point

Any oil intended for low temperature service should be able to flow at the lowest temperature likely to be encountered. The procedure for determining pour point is described in ASTM D-97.

The invention will be more clearly understood by referring to the examples and controls which follow:

EXAMPLE 1 HFC OIL

This example represents the best mode known for preparing and using the preferred HFC oil, i.e., the polymerization product of $R_f$—(CH$_2$) CH=CH$_2$, with HFC-134a in compression refrigeration.

Specifically, this HFC oil was prepared by adding 100 grams of the $R_f$(CH$_2$) CH=CH$_2$ to a reaction vessel. The vessel was heated to 110° C. and sparged with nitrogen for 1 hour. The sparging apparatus was removed and replaced by a nitrogen head. To the solution in the reaction vessel was added 12.5 grams of t-butyl-peroxyisopropylcarbonate (75% solution in mineral spirits) in one portion. The solution was then heated at 110° C. for about 18 hours. The reaction was monitored by 1H NMR until the olefin peaks between sigma 5 and 6 ppm disappeared. The vessel was cooled, equipped for vacuum distillation and the volatiles removed at a pot temperature of 60° C. and a pressure of 10 torr. The resulting 90–100 grams of yellow liquid was analyzed to be the aforementioned polymerization product

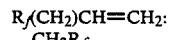
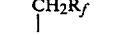
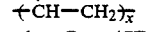

$R_f(CH_2)CH=CH_2$:
$$\begin{array}{c} CH_2R_f \\ | \\ +CH-CH_2\rightarrow_{\overline{x}} \end{array}$$
where $R_f = (CF_2)_y F$
and y = 6,8,10 and higher
(60%, 30%, 10%)

1H-NMR spectrum analysis of the product revealed that the chemical shifts of the starting material disappeared and a broad multiplet was formed for the product. The starting material, gave the following spectral lines: 6.0–5.7 (m, 1H); 5.6–5.3 (m, 2H); 3.05 (doublet of triplets, 2H, J=20 Hz, J=6.6 Hz). The product gave a broad multiplet between 3.0–0.9 ppm. IR analysis showed absorbances at 3050–2850 cm⁻¹ (CH=CH$_2$) and (CH$_2$ stretches); 1400–1000 cm⁻¹ (CF$_2$ stretching). 13C - NMR shows several peaks for the product in the range from 123 to 19 ppm, but there is a clear absence of the peaks corresponding to the starting monomer at 126 (triplet) and 123 ppm. The average molecular weight was determined by Vapor Phase Osmometry to be 3200.

The viscosity and pour point of the product were 1,000 SUS at 100° F. and less than −20° C., respectively. Viscosities ranging from 440 to 2540 SUS at 100° F were also made by using process variations. Since the latter oil had a viscosity of 9.6 SUS at 210° F., the viscosity slope (Equation 1) is −4.14. This compares favorably with the slope of −4.23 for a naphthenic oil used with CFC-12 in automotive air-conditioning. This oil's pour point and 40° C. and 100° C. viscosities are: −23° C., 525 SUS and 55 SUS, respectively.

These low to high viscosity HFC oils were found to be completely miscible with HFC-134a from at least −40° to 93° C., the highest temperature run in the solubility tests. The presence of 1.3 wt. % of SYN-O-AD® 8478 EP additive in the high viscosity oil raised the minimum miscibility temperature from −40° to −35° C. SYN-O-AD® is a product of the Stauffer Chemical Company. Further, since CFC-12 is also completely miscible from −40° to 93° C., the HFC oil may be used interchangeably in compressor refrigeration.

Other commercial or developmental oils, which are described in the control Examples in Tables I and II, lack the required solubility (complete miscibility from −10° to 100° C.) to be acceptable lubricants for automotive air-conditioning. Table II includes the Suniso® 5GS naphthenic and BVM-100N paraffinic oils currently used with CFC-12 in automotive air-conditioning.

The lubricity results with the HFC oil of this example, as measured by the "Four-ball wear test" and the "Falex" pin/V-block, load-to-failure test are summarized in Tables III and IV along with other oils. The HFC oil compares very favorably with the naphthenic and paraffinic oils currently used with CFC-12 in automotive air-conditioning.

The stability of HFC-134a or CFC-12 plus the HFC oil and metals is also superior to the naphthenic and paraffinic oils (Table V). The key to the visual-effect ratings in the table are: 0 - no change, 1 - very very slight, acceptable change, 2 - very slight, borderline change, 3 - slight, but unacceptable change, 4 - moderate, unacceptable change, and 5 - severe change.

EXAMPLE 2 - HFC OIL MONOMER/BUTYL VINYL ETHER (BVE) COPOLYMER

This example involves preparing and using HFC oils that are copolymers i.e., the copolymerization products of $R_f$—CH=CH$_2$ and $nC_4H_9OCH$=CH$_2$, with HFC-134a in compression refrigeration.

Specifically, the copolymer HFC oils were prepared by adding 70-95 grams of $R_f$—CH=CH$_2$ and 30-5 grams of butyl vinyl ether to a reaction vessel, and then repeating the procedure of Example 1.

1H-NMR spectrum analysis of the product revealed that the chemical shifts corresponding to the olefinic protons, 6.5–5.0 ppm, disappeared and broad peaks appeared between 3.0–1.0 ppm in the spectra. The 13C NMR showed peaks for the products between 123 and 19 ppm. Also, the starting olefin peaks for $R_f$CH=CH$_2$ were gone, i.e., 127 (triplet) and 126 (triplet) ppm. The IR shows absorbances at 3000–2850 cm$^{-1}$ (CH$_2$ stretching); 1400-1000 cm$^{-1}$ (CF$_2$ stretching).

The range of oil viscosities and the solubilities of these oils in HFC-134a are summarized in Table VI.

The acceptable composition range for butyl vinyl ether in the copolymer is about 1 to 30 wt. %, the preferred range is about 1 to 10 wt. %.

EXAMPLE 3 - HFC OIL BLENDS WITH OTHER OILS

HFC oils of different viscosities may be blended to adjust for a variety of intermediate viscosities. An HFC oil may also be blended with other oils to obtain a specific viscosity as well, especially if the second oil is also completely soluble in HFC-134a. A specific example of a second oil is: 1,1,1,2,2,3,3,4,4,5,5,6,6 - tridecafluoro-7 hexadecene (TDFH) which has a 100° F. viscosity of 34 SUS, a pour point of −17° C. and is completely miscible in HFC-134a from 93° to −17° C. A mixture of the HFC oil of Example 1 with a viscosity of 1800 SUS at 100° F. with the TDFH oil, containing 9.1 wt. % of the latter yielded an oil with viscosities of 520 SUS and 55 SUS at 100° and 210° F., respectively. This yields a viscosity slope of −4.21 which compares favorable with the −4.23 slope for the naphthenic oil used with CFC-12 in automotive air-conditioning. Its solubility characteristics are shown in Table VII where it is shown to be miscible from 93° C. to at least −35° C.

An HFC oil/TDFH—89.3/10.7 wt. % blend was made to obtain a 525 SUS viscosity at 100° F. to test its lubrication properties. Table VIII shows the blend does not surpass the control oil when saturated with refrigerant at atmospheric pressure in the Four-ball wear test, but does surpass the control in the Falex test. An EP additive should enhance the results of the first test.

Other classes of oils which may be blended with the HFC oil are partially or fully fluorinated hydrocarbons.

TABLE 1

SOLUBILITY OF HFC-134a WITH COMMERCIAL FLUORINATED OILS
(Test Range 93° to −50° C.)

| Expt. No. | Lubricant | Miscible Range (°C.) for Indicated Concentrations (Wt. %) of HFC-134a | | |
|---|---|---|---|---|
| | | 30% | 60% | 90% |
| Control A | 500 SUS blend, Halocarbon 700/95-6.7/93.3 wt. % (a) | 93 to 8 | 93 to 7 | 93 to −4 |
| Control B | 150 SUS, Krytox® GPL Blend (b,c) | 93 to 0 | 93 to 10 | 93 to 20 |
| Control C | 480 SUS, Krytox® GPL Blend (b,c) | 93 to 10 | 93 to 20 | 93 to 20 |
| Control D | 417 SUS, Fomblin® Y 25/5 (b,d) | 93 to 5 | 93 to 15 | 93 to 15 |
| Control E | 417 SUS, Fomblin® Z-15 (b,d) | 93 to 5 | 93 to 28 | 75 to 28 |
| Control F | 300 SUS, Demnum® S-65 (b,d) | 93 to 15 | 93 to 22 | 93 to 22 |

(a) - Polychlorotrifluoroethylene oil. A product of Halocarbon Products Corporation.
(b) - A perfluorinated poly alkyl ether oil
(c) - A product of E. I. du Pont de Nemours and Co.
(d) - A product of Montefuos, Division of Montedison Group
(e) - A product of Daikin, Industries Ltd.

TABLE II

SOLUBILITY OF HFC-134a WITH AVAILABLE MISCELLANEOUS REFRIGERANT OILS

| Expt. No. | | Miscible Range (°C.) for Indicated Concentrations (Wt %) of HFC-134a in Lubricant | | |
|---|---|---|---|---|
| | | 30% | 60% | 90% |
| | Expt. Dipentaerythritol Esters of Fatty Acids (c) | | | |
| Control G | 240 SUS | −50+ | −4+ | 40+ |
| Control H | 290 SUS | −44+ | −17+ | 70+ |
| | Expt. PEG Esters of Fatty Acids (d) | | | |
| Control I | 144 SUS | −21+ | 54 (a) | 54 (a) |
| Control J | 620 SUS | −4+ | 4+ | 70+ |
| Control K | 830 SUS | −6+ | 70+ | 70+ |
| | Naphthenic Oils (e) | | | |
| Control L | Suniso ® 5GS (500 SUS, 38% aromatic) | 54 (a) | 54 (a) | 54 (a) |
| Control M | Witco 500 (500 SUS) | 54 (a) | 54 (a) | 54 (a) |
| Control N | Expt. Oil (520 SUS, 47% aromatic) | 54 (a) | 54 (a) | 54 (a) |
| Control O | Expt. Oil (529 SUS, 75% aromatic) | 54 (a) | 54 (a) | 54 (a) |
| | Paraffin Oil (f) | | | |
| Control P | BVM-100N (500 SUS) | 54 (a) | 54 (a) | 54 (a) |
| | Alkyl Benzene | | | |
| Control Q | Zerol 300 (300 SUS) (g) | 54 (a) | 54 (a) | 54 (a) |
| Control R | DN600 (125 SUS) (h) | 54 (a) | 54(a) | 54 (a) |
| Control S | Atmos HAB15F (78 SUS) (i) | 55+ | Ins (b) | Ins (b) |
| | Silicone Oils | | | |
| Controls T, U,V | L-45 Oils (163, 231 & 462 SUS) (j) | | | |

+ - Soluble at and above shown temperature.
(a) - Perhaps it is soluble somewhere above shown temperature.
(b) - Completely insoluble from 93 to −50° C.
(c) - Hercules
(d) - CPI Engineering
(e) - Witco Chemical Company
(f) - BVM Associates
(g) - Shrieve Chemical Company
(h) - Conoco
(i) - Nippon Oil KK
(j) - Union Carbide

TABLE III

LUBRICITY OF LUBRICANTS UNDER ONE ATMOSPHERE OF REFRIGERANT GAS PRESSURE IN A FOUR-BALL WEAR TEST AT 225° F.

| Expt. No | Refrigerant | Lubricant | 100° F. Visc. (SUS) | Ball Scar Wear* (mm) (a) | Coefficient of Friction* (b) |
|---|---|---|---|---|---|
| 1 | HFC-134a | HFC oil** | 1000 | 0.221 | 0.058 |
| 2 | CFC-12 | " | | 0.221 | 0.051 |
| 3 | None | " | | 0.409 | 0.072 |
| Control X | CFC-12 | Napthenic | 525 | 0.373 | 0.072 |
| Control Y | None | " | | 0.618 | 0.050 |
| Control Z | CFC-12 | Paraffinic | 500 | 0.368 | 0.071 |
| Control A' | None | " | | 0.505 | 0.056 |
| Control B' | CFC-134a | Krytox ® 143AC | 1247 | 0.511 | 0.080 |
| Control C' | None | Krytox ® 143AC | | 0.336 | 0.076 |

(a) - ± 0.028 standard deviation
(b) - ± 0.006 standard deviation
*The smaller the better
**The HFC oil prepared in Example 1

TABLE IV

LOAD-CARRYING ABILITY OF LUBRICANTS UNDER ONE ATMOSPHERE OF REFRIGERANT GAS PRESSURE IN FALEX PIN/V-BLOCK TEST

| Expt. No. | Gas | Lubricant | 100° F. Visc. (SUS) | Fail Load (lbs.)* | Torque at Fail (in.-lbs.)* |
|---|---|---|---|---|---|
| 4 | HFC-134a | HFC oil** | 1000 | 2250 | 34 |
| 5 | CFC-12 | " | " | 2250 | 43 |
| 6 | None | " | " | 2250 | 50 |
| Control D' | CFC-12 | Naphthenic | 525 | 1250 | 24 |
| Control E' | None | " | " | 750 | 13 |
| Control F' | CFC-12 | Paraffinic | 500 | 1300 | 26 |

*The larger the better
**The HFC oil prepared in Example 1

TABLE V

STABILITY OF HFC-134a IN CONTACT WITH LUBRICANT PLUS COUPLED STEEL-1010/COPPER/ALUMINUM-1100 AT 268° F. FOR 11.8 DAYS
(Approximately equal to 10 years of car life)

| Expt. No. | Refrigerant | Lubricant | $Cl^-$ or $F^-$* Generated (ppm) | Visual-Effect Rating | | |
|---|---|---|---|---|---|---|
| | | | | Liquid | Steel | Cu | Al |
| 7 | HFC-134a | HFC oil** | <0.2* | 0 | 0 | 0 | 0 |
| 8 | CFC-12 | " | 8 | 0 | 1 (a) | 0 | 1 (b) |
| Control G | CFC-12 | Naphthenic | 423 | 4 (c) | 3 (d) | 2 (f) | 2 (g) |

TABLE V-continued

STABILITY OF HFC-134a IN CONTACT WITH LUBRICANT PLUS COUPLED STEEL-1010/COPPER/ALUMINUM-1100 AT 268° F. FOR 11.8 DAYS
(Approximately equal to 10 years of car life)

| Expt. No. | Refrigerant | Lubricant | $Cl^-$ or $F^{-*}$ Generated (ppm) | Visual-Effect Rating Liquid | Steel | Cu | Al |
|---|---|---|---|---|---|---|---|
| Control H | CFC-12 | Paraffinic | — | 0 | 3 (e) | 0 | 0 |

(a) - Very very slight tarnish - 30% liquid phase
(b) - Trace pitting - <1% of surface
(c) - Brown color plus moderate black precipitate
(d) - Brown deposit/gray film - 25%/75% of surface plus moderate deposit of solids at liquid-gas interface (LGI)
(e) - Slight copper plating plus gray film - 100% of surface
f - Dark tarnish - 25% (f) moderate deposit at LGI
(g) - Very slight etched plus moderate deposit at LGI
*No HFC-134a decomposed
**The HFC oil prepared in Example I

TABLE VI

SOLUBILITY OF HFC-134a WITH TELOMER B OLEFIN/BUTYL VINYL ETHER (BVE) COPOLYMERS
Test Range: 93 to −50° C.

| Expt. No. | Wt. % BVE in Copolymer | 100° F. Viscosity (SUS) | Wt. % HFC in HFC/oil | Temperature Range (°C./°C.) Cloudy(a) | Hazy | Soluble(b) |
|---|---|---|---|---|---|---|
| 9 | 5 | 1,640 | 30 | — | — | 93/−33 |
|   |   |       | 60,90 | — | — | 93/−45 |
| 10 | 10 | 310 | 30,60 | — | 93/−30 | — |
|    |    |     | 90 | — | — | 93/−30 |
| 11 | 20 | 330 | 30,60 | — | 93/−40 | — |
|    |    |     | 90 | — | 93/−30 | — |
| 12 | 30 | 280 | 30 | 93/80 | 80/−40 | — |
|    |    |     | 60 | — | 93/−38 | — |
|    |    |     | 90 | — | 15/−30 | 93/−15 |

(a) - opaque, white
(b) - clear solution

TABLE VII

SOLUBILITY OF HFC-134a WITH AN OIL BLEND OF HFC OIL/TDFH OIL - 89.3/10.7 WT. %
Test Range: 93 to −50° C.

| Expt. No. | Wt. % HFC-134a in HFC-134a/Oil | Temperature Range (°C.) | Comments |
|---|---|---|---|
| 13 | 30 | 93 to −45 | Slight haze |
|    | 60 | 93 to 10 | Clear solution |
|    |    | 10 to −40 | Slight haze |
|    | 90 | 93 to −38 | Clear solution |

TABLE VIII

LUBRICITY OF HFC OIL/TDFH - 89.3/10.7 WT. % BLEND UNDER ONE ATMOSPHERE PRESSURE OF REFRIGERANT GAS

| | HFC/TDFH Oil (520 SUS) (a) Expt. No. 14 | Naphthenic Oil (525 SUS) (b) Control I' |
|---|---|---|
| Four-ball Wear Test | | |
| Scar Wear (mm) (c) | 0.510 | 0.373 |
| Coefficient of Friction (d) | 0.075 | 0.072 |
| Falex Test | | |
| Fail Load* (lbs) | 1780 | 1250 |
| Torque at Fail* (in. lbs.) | 40 | 24 |

(a) - Under HFC-134a
(b) - Under CFC-12
(c) - ± 0.028 standard deviation
(d) - ± 0.006 standard deviation
*The larger the number, the better

What is claimed is:

1. A composition for use in compression refrigeration comprising:
   (a) a saturated hydrocarbon having 1-4 carbon atoms that is partially or fully substituted with at least one atom of chlorine or fluorine and having a normal boiling point in the range of −80° C. to +50° C.; and
   (b) a sufficient amount to provide lubrication of at least one fluorinated hydrocarbon in which the weight ratio of fluorine-to-carbon is from about 0.5 to 5 and having an SUS viscosity at 100° F. of at least 50.

2. The composition of claim 1 wherein component (a) is at least one compound selected from the group consisting of 1,1,1,2-tetrafluoroethane; 1,1,2,2-tetrafluoroethane; pentafluoroethane; dichlorodifluoromethane; and trichlorotrifluoroethane.

3. The composition of claim 1 wherein component (b) is a polymer of $R_f(CH_2)_n CH=CH_2$ wherein $R_f$ is from $CF_3$- to $C_{20}F_{41}$- and n=0-2.

4. The composition of claim 3 wherein $R_f$ comprises about 60% $C_6F_{13}$-, 30% $C_8F_{17}$- and about 10% $C_{10}F_{21}$- and higher; and n=1.

5. The composition of claim 3 wherein said polymer is a copolymer of $R_f(CH_2)_n CH=CH_2$ with 1-30% by weight of at least one comonomer selected from the group consisting of a vinyl ether, an acrylate, a methacrylate, acrylonitrile and vinyl ethoxylate.

6. This composition of claim 5 wherein said comonomer is butyl vinyl ether.

7. The composition of claim 3 wherein said polymer is a copolymer of $R_f(CH_2)_n CH=CH_2$ and 1–10% by weight of butyl vinyl ether.

8. The composition of claim 3 wherein component (a) is 1,1,1,2-tetrafluoroethane.

9. The composition of claim 7 wherein component (a) is 1,1,1,2-tetrafluoroethane.

10. The composition of claim 1 wherein component (b) is blended with at least one fluorinated hydrocarbon in which the weight ratio of fluorine-to-carbon is from about 0.5 to 5 and has an SUS viscosity at 100° F. of at least 50.

11. The composition of claim 3 wherein component (b) also contains up to 20% by weight of 1,1,1,2,2,3,3,4,4,5,5,6,6-tridecafluoro-7-hexadecene.

12. A lubricant adapted for use in compression refrigeration with a saturated hydrocarbon refrigerant having 1–4 carbon atoms that is partially or fully substituted with at least one atom of chlorine or fluorine and has a normal boiling point in the range of −80° C. to +50° C., consisting essentially of at least one fluorinated hydrocarbon in which the ratio of fluorine-to-carbon is from about 0.5 to 5, and has an SUS viscosity at 100° F. of at least 50 and a pour point of less than −20° C.

13. A method for lubricating compression refrigeration equipment using as the refrigerant a saturated hydrocarbon having 1–4 carbon atoms that is partially or fully substituted with at least one atom of fluorine or chlorine and has a normal boiling point in the range of −80° C. to +50° C. consisting essentially of using 10–50% by volume of the combination with said refrigerant of at least one fluorinated hydrocarbon in which the weight ratio of fluorine-to-carbon is from about 0.5 to 5 and has an SUS viscosity at 100° F. of 100 to 1200 and a pour point of less than −20° C.

* * * * *